(12) United States Patent
Bron et al.

(10) Patent No.: US 6,657,402 B2
(45) Date of Patent: Dec. 2, 2003

(54) PORTABLE DEVICE WITH REDUCED POWER DISSIPATION

(75) Inventors: Andries Bron, Drachten (NL); Wilhelmus Gerardus Maria Ettes, Drachten (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/082,873

(22) Filed: Oct. 19, 2001

(65) Prior Publication Data

US 2002/0153847 A1 Oct. 24, 2002

(30) Foreign Application Priority Data

Oct. 24, 2000 (EP) .............................................. 00203687

(51) Int. Cl.⁷ .............................. G05F 1/00; H05B 37/02
(52) U.S. Cl. ........................................ 315/291; 315/105
(58) Field of Search ................................. 315/291, 307, 315/308, 219, 209 R, 224, 312, 225, 362, 295, DIG. 5, DIG. 7, 105, 302, 101, 106, DIG. 4

(56) References Cited

U.S. PATENT DOCUMENTS

| | | | |
|---|---|---|---|
| 5,705,894 A | | 1/1998 | Krummel .................... 315/119 |
| 5,747,942 A | * | 5/1998 | Ranganath .................. 315/224 |
| 5,770,925 A | * | 6/1998 | Konopka et al. ........... 315/225 |
| 5,925,990 A | | 7/1999 | Crouse et al. ............... 315/307 |
| 5,945,788 A | * | 8/1999 | Li et al. ...................... 315/308 |
| 5,969,483 A | * | 10/1999 | Li et al. ...................... 315/225 |
| 5,973,455 A | * | 10/1999 | Mirskiy et al. ............. 315/105 |
| 5,977,725 A | * | 11/1999 | Miyazaki et al. ........... 315/291 |
| 6,008,592 A | * | 12/1999 | Ribarich ..................... 315/225 |
| 6,069,455 A | * | 5/2000 | Moisin ........................ 315/219 |
| 6,091,207 A | * | 7/2000 | Fischer ........................ 315/224 |
| 6,140,779 A | * | 10/2000 | Kanazawa et al. .......... 315/291 |
| 6,177,769 B1 | * | 1/2001 | Bezdon et al. .............. 315/291 |
| 6,181,079 B1 | * | 1/2001 | Chang et al. ................ 315/247 |
| 6,236,168 B1 | * | 5/2001 | Moisin ........................ 315/291 |
| 6,281,636 B1 | * | 8/2001 | Okutsu et al. ........... 315/209 R |
| 6,326,740 B1 | * | 12/2001 | Chang et al. ................ 315/291 |
| 6,366,032 B1 | * | 4/2002 | Allison et al. ............... 315/307 |

* cited by examiner

Primary Examiner—Don Wong
Assistant Examiner—Chuc Tran
(74) Attorney, Agent, or Firm—Ernestine C. Bartlett

(57) ABSTRACT

A low power portable device includes a terminal (2) for connection of the device to a power source. A rectifier (3) is connected to the terminal and a half-bridge circuit (4) is connected to the rectifier in order to generate an a.c. switching voltage and includes a half-bridge point (5). A control circuit (6) controls the half-bridge circuit from a power supply (7) which derives a supply voltage for the control circuit from the switching AC voltage supplied by the half-bridge circuit. The power supply comprises a charging capacitor (10) connected to the half-bridge point. A load circuit (8) is connected to the half-bridge point and the charging capacitor is connected to the half-bridge point through an impedance (13, 16).

27 Claims, 3 Drawing Sheets

PORTABLE DEVICE WITH REDUCED POWER DISSIPATION

BACKGROUND OF THE INVENTION

The present invention relates to a device comprising: a terminal for connection of the device to a power source; a rectifier connected to the terminal; a half-bridge circuit connected to the rectifier in order to generate an a.c. switching voltage and having a half-bridge point; a control circuit for controlling the half-bridge circuit; a power supply for deriving a supply voltage for the control circuit from the a.c. switching voltage supplied by the half-bridge circuit, said power supply comprising a charging capacitor connected to said half-bridge point, and a load circuit connected to the half-bridge point.

Such a device is known from U.S. Pat. No. 5,705,894, where the power supply comprises essentially a pair of diodes, where the charging capacitor is connected, on the one hand, to the node between the pair of diodes and, on the other hand, directly to the output of the half-bridge circuit. The half-bridge circuit, together with the control circuit, forms a half-bridge resonant converter for driving a load.

The control circuit of the known device includes means for selectively accepting the supply voltage by simply short-circuiting the power supply when the applied supply voltage is not within a predetermined range.

A disadvantage of the known device is that dissipation especially in at least one of the pair of diodes of the power supply, is high, especially when high rectified voltages from the rectifier are supplied to the half-bridge circuit.

SUMMARY OF THE INVENTION

According to the invention, in order to obviate or at least mitigate the above-mentioned problems of the known device, a device is provided which is characterized in that the charging capacitor is connected to the half-bridge point through an impedance. The present invention is based on the insight that an impedance can stabilize the current through the above-mentioned one of the pair of diodes, which current will therefore remain practically constant, whatever the rectified voltage from the rectifier. Thus, dissipation is reduced and a more economical device is provided.

Preferably, the impedance connecting the charging capacitor to the half-bridge point comprises a coil in series with the charging capacitor. This is a very elegant and simple embodiment of the present invention.

The load circuit can be connected to the half-bridge point through a transformer, which transformer has its primary side connected to the half-bridge point. Such a transformer has the advantage that a power level suitable for the load circuit can be obtained. The load circuit can be connected to the half-bridge point through a connecting impedance, which is preferably a coil.

In a configuration where the load is connected to the half-bridge point through a connecting impedance, the charging capacitor is preferably connected to the connecting impedance at the side of the connecting impedance remote from the half-bridge point. Thus, the impedance connected between the half-bridge point and the load circuit at the same time forms the impedance through which the charging capacitor is connected to the half-bridge point. Thus, an additional component to form the impedance between the charging capacitor and the half-bridge point is no longer necessary, and the present invention is realized without having to add components to the device.

The present invention is especially advantageous when the device is portable and its terminal can be connected to a number of power sources with different power levels. Such devices can be portable razors, battery chargers, for example for a mobile phone etc. When travelling, a user is confronted with many power levels of local power sources. Such power levels range between 100 V and 230 V approximately. The rectified voltages provided by the rectifier therefore vary between essentially 100 and 400 V. Without the features of the present invention the dissipation of said one of the pair of diodes in the power supply at 400 V can be eight times as high as the dissipation thereof at 100 V. Dimensioning this diode for worst-case conditions (400 V) would result in such large diode that it could no longer be used in the portable devices, which are preferably as small as possible. If this dissipating diode would not be dimensioned for worst-case conditions (400 V) in order to save room, the dissipating diode would overheat when subjected to such worst-case conditions. According to the present invention this problem is effectively overcome.

BRIEF DESCRIPTION OF THE DRAWINGS

The invention will be more fully described hereinbelow, where further features, advantages and functions thereof will become apparent, which description is to be taken in conjunction with the accompanying drawings, in which.

In the drawings the same or similar components, elements and sub-assemblies bear the same reference numerals.

Figure 1:
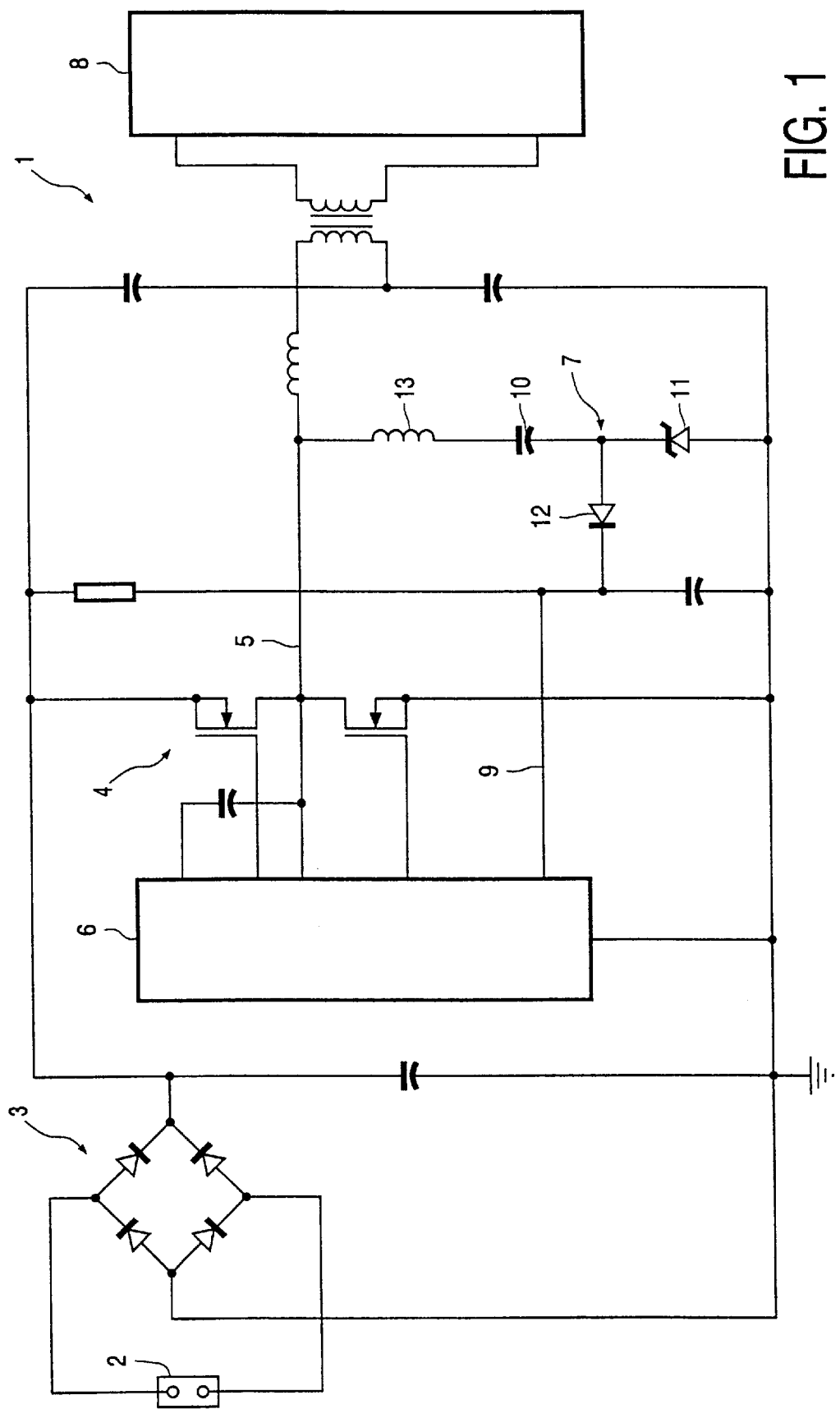
FIG. 1 shows a first embodiment of the present invention.

The device 1 of FIG. 1, which is shown schematically, comprises a terminal 2, a rectifier 3, which is connected to the terminal 2, a half-bridge circuit 4 connected to the rectifier, for generating an a.c. switching voltage, the output of the half-bridge circuit being referred to as the half-bridge point 5, a control circuit 6 for the half-bridge circuit 4, a power supply 7 for applying a supply voltage to the control circuit through a line 9; and a load circuit 8.

The load circuit 8 can be, for example, the motor of a portable shaver or a similar sub-assembly such as a charger for the battery of a portable phone, etc. The load circuit 8 is connected to the half-bridge point 5 via a transformer. The power supply 7 provides the supply voltage for the control circuit, the supply voltage being derived from an a.c. switching voltage, which is generated by the half-bridge circuit 4.

The power supply 7 essentially comprises two diodes 11, 12, of which one diode can be a dissipating diode. In FIG. 1 this is the zener diode 11. The power supply 7 further comprises a charging capacitor 10, which is connected on the one hand, to the node between the diodes 11, 12 and, on the other hand, to the half-bridge point 5 through an impedance, which, in the embodiment shown in FIG. 1 is formed by a coil 13.

The coil 13 ensures that the current through the zener diode 11 remains practically constant and independent of the rectified power levels provided by the rectifier 3. Dissipation in the zener diode 11 is kept low and this zener diode 11 need not be overdimensioned or enlarged to be able to cope with higher voltages and the corresponding dissipation.

Especially in the case where the device is portable, this is relevant. A portable device, such as a portable shaver, can be connected to mains supplies ranging between 100 and 230 V. Therefore, after the terminal 2 has been connected to such a mains supply, the rectified voltages from the rectifier 3 may range from 100 to 400 V. According to the invention the impedance formed by the coil 13 in FIG. 1 ensures a substantially constant current through the zener diode, independent of the rectified voltages from the rectifier 3, and therefore independent of the mains supply level, to which the terminal 2 is connected in practice. in The manner in which the control circuit 6 functions in conjunction with the half-bridge circuit 4 is well known in the art and, for example, at least partially described in the above referenced U.S. Pat. No. 5,705,894. As the manner in which the control circuit 6 and the half-bridge circuit 4 function to drive the load 8 is commonly known in the art, further description thereof is omitted here.

Figure 2:
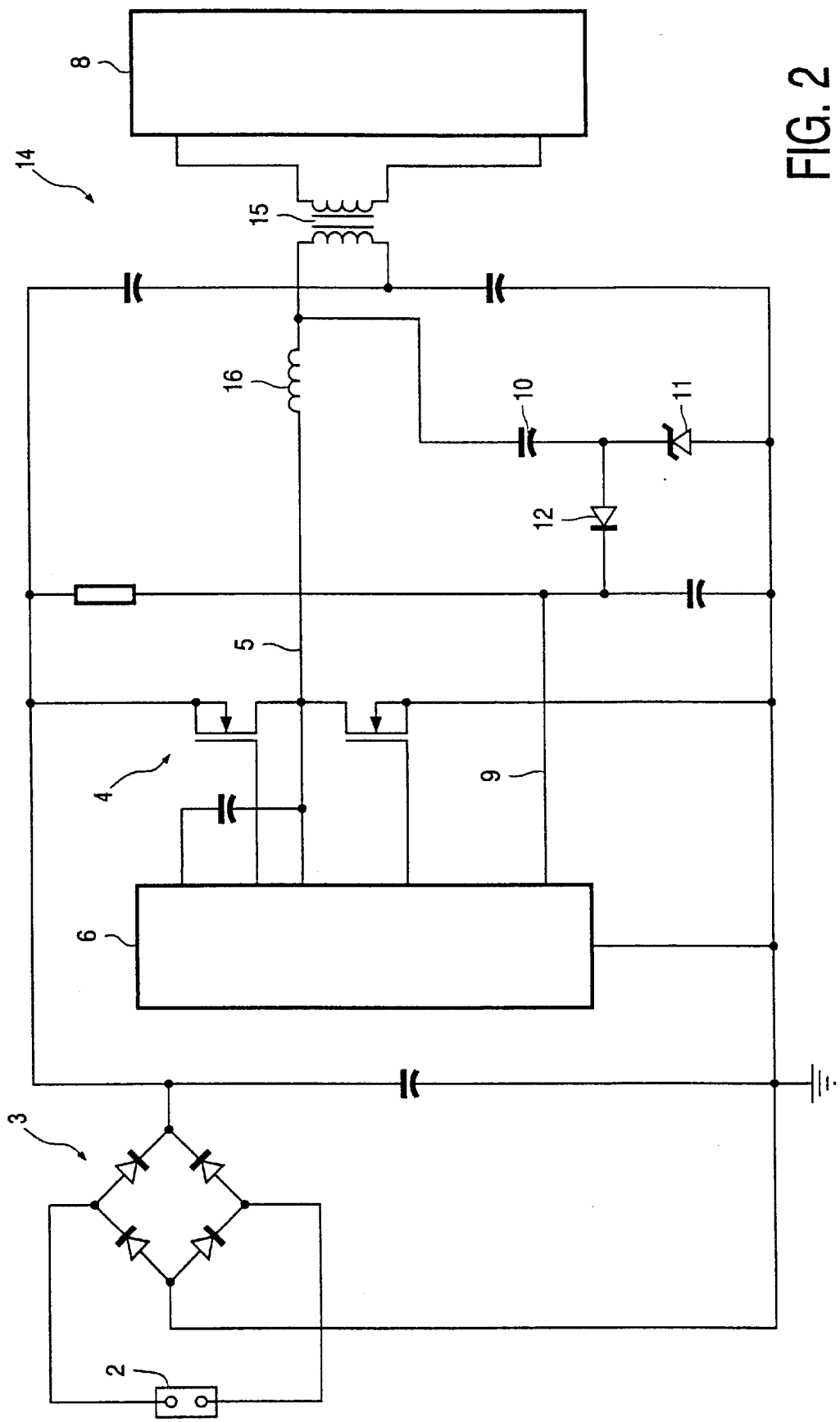
FIG. 2 shows a second embodiment of the present invention.

Referring to FIG. 2, it is to be noted that in the device 14 according to the present invention, shown in FIG. 2, the load circuit 8 is connected to the half-bridge point 5 through a transformer 15, which has its primary side connected to the half-bridge point 5 through an impedance, which is formed by the coil 16.

The device 14 of FIG. 2 is a further simplification in comparison with the device 1 of FIG. 1, in that in FIG. 1 the coil 13, which forms an impedance between the charging capacitor 10 and the half-bridge point 5, is an additional component, which is no longer necessary in the device 14 of FIG. 2.

The charging capacitor 10 is, on the one hand, still connected to the node between the diodes 11, 12 but is, on the other hand, connected to the node between the transformer 15 and the impedance formed by the coil 16, which coil 16 is connected to the half-bridge point 5. In most prior art devices the coil 16 is already present for scaling, matching or connecting purposes between the transformer 15 and the half-bridge point 5.

Therefore, no additional components are used as compared with the prior art devices, but by providing an impedance between that side of the charging capacitor 10 which is remote from the node between the diodes 11 and 12, the current through the dissipating or zener diode 11 is stabilized, as a result of which the dissipation in the diode 11 is minimized.

Figure 3:
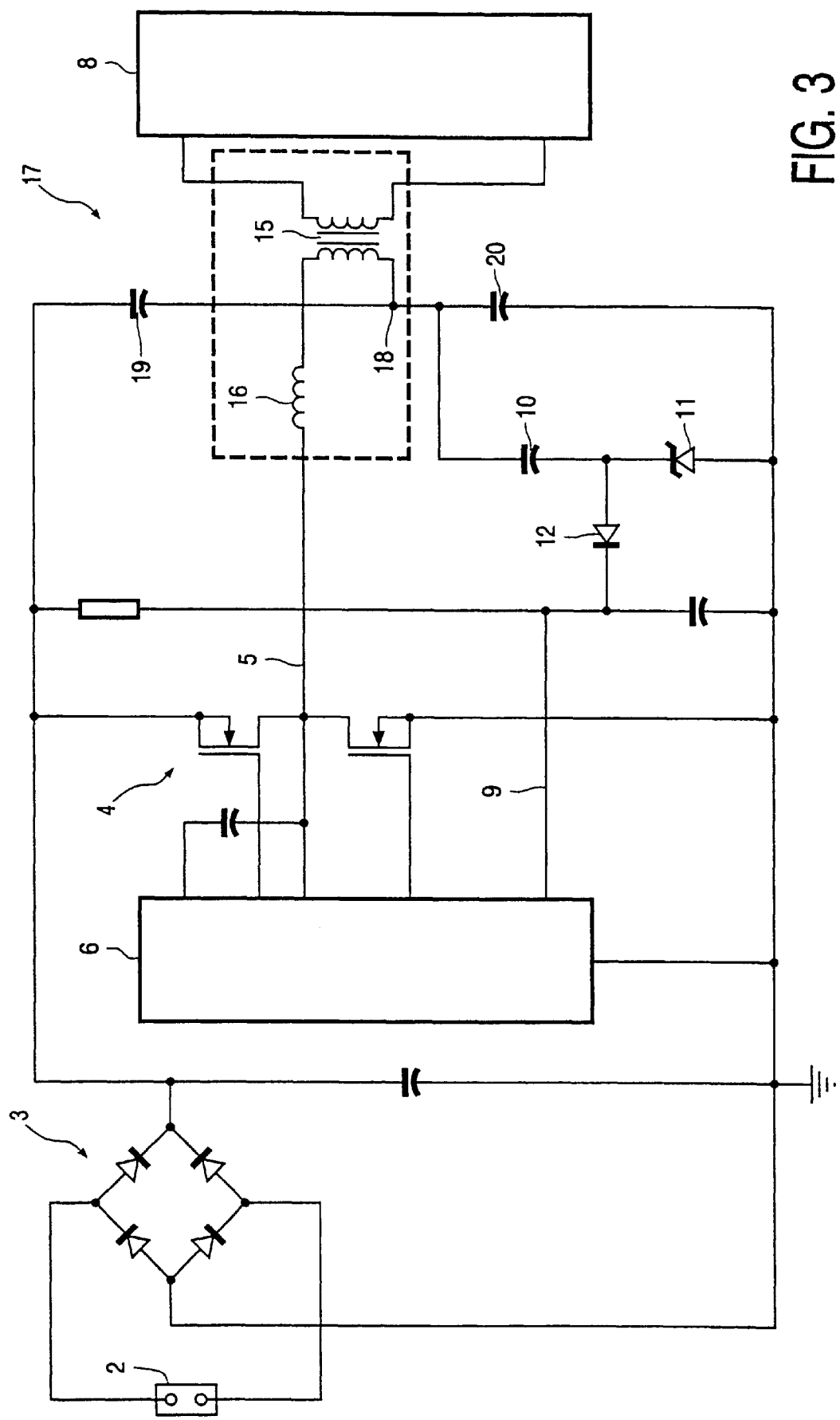
FIG. 3 shows a third embodiment of the present invention.

FIG. 3 shows a third embodiment of a device 17 according to the present invention. The charging capacitor 10 is now connected to another end 18 of the primary side of the transformer 15 than in the embodiment of FIG. 2. Here, the impedance formed by the coil 16 is a part of or is incorporated in the transformer 15, which is indicated by dashed lines in FIG. 3. As a result, signal at the node between capacitors 19, 20 resonates, as do the signals across these capacitors 19, 20.

In this configuration of FIG. 3 the charging capacitor 10 is connected to the half-bridge point 5 through the node between the capacitors 19, 20 via the impedance of the transformer 15, which is here represented as the separate coil 16.

Thus the internal impedance of the transformer 15, shown as the separate coil 16, is the relevant impedance for the present embodiment of the invention.

Based on the description above it will be apparent that many alterations, adaptations and alternative embodiments are possible for a person skilled in the art. Therefore the present invention is not to be limited to the embodiments described and shown explicitly herein, but exclusively by the definitions of the scope of protection for the present invention according to the appended claims, where the descriptions and drawings are to be used to interpret the claims.

What is claimed is:

1. A device, comprising:
   a terminal for connection of the device to a power source;
   a rectifier connected to the terminal;
   a half-bridge circuit connected to the rectifier in order to generate an a.c. switching voltage, and having a half-bridge point;
   a control circuit for controlling the half-bridge circuit;
   a power supply for deriving a supply voltage for the control circuit from the a.c. switching voltage generated by the half-bridge circuit, said power supply comprising a charging capacitor coupled to the half-bridge point through an impedance; and
   a load circuit coupled to the half-bridge point.

2. A device as claimed in claim 1, wherein the impedance coupling the charging capacitor to the half-bridge point comprises a coil in series with the charging capacitor.

3. A device as claimed in claim 1, wherein the load circuit comprises a transformer having a primary side connected to the half-bridge point.

4. A device as claimed in claim 1, wherein the load circuit is coupled to the half-bridge point through a connecting impedance.

5. A device as claimed in claim 4, wherein the charging capacitor is connected to the connecting impedance at a side of the connecting impedance remote from the half-bridge point.

6. A device as claimed in claim 4, wherein the connecting impedance comprises a connecting coil.

7. A device as claimed in claim 1, wherein the device is portable and the terminal is connectable to AC power sources with different voltages levels.

8. A device as claimed in claim 1 wherein the supply voltage derived by the power supply for the control circuit is a DC supply voltage.

9. A device as claimed in claim 1 wherein the power supply further comprises a rectifier element coupled to the charging capacitor, and the impedance is operative so as to stabilize current flow through the power supply rectifier element independent of the magnitude of the voltage of the power source.

10. A device as claimed in claim 1 wherein the impedance comprises an inductor in series with the charging capacitor, the charging capacitor is connected to the inductor at a side of the inductor remote from the half-bridge point, and the load circuit is coupled to the half-bridge point via the inductor.

11. A device as claimed in claim 1 wherein the power supply further comprises a rectifier element in series with the charging capacitor.

12. A device as claimed in claim 1 wherein the impedance comprises an inductor in series with the charging capacitor to form a non-resonant LC series circuit.

13. A Circuit for operation with AC supply voltages of different magnitude, comprising:
   an input terminal adapted for connection to AC supply voltages of different magnitude,
   a half-bridge circuit for deriving an AC switching voltage and having a half-bridge point,
   a rectifier means coupled between the input terminal and the half-bridge circuit,
   control circuit means having an output coupled to a control input of the half-bridge circuit for controlling the operation thereof,
   a power supply including at least one rectifier element and arranged to derive a DC supply voltage for the control circuit means from the AC switching voltage, said power supply comprising a charging capacitor coupled to the half-bridge point via an impedance means, and an output terminal for connection to a load circuit and coupled to the half-bridge point.

14. The circuit as claimed in claim 13 wherein the impedance means comprises an inductor connected in series with the charging capacitor and having an inductance value such as to stabilize current flow through the power supply rectifier element for the different magnitudes of AC supply voltages to which the input terminal is connectable.

15. The circuit as claimed in claim 14 wherein the AC supply voltages are in the range of 110V to 230V and said inductor maintains said current flow through the power supply rectifier element approximately constant over said range of AC supply voltages.

16. The circuit as claimed in claim 13 further comprising a first inductor for coupling the output terminal to the half-bridge point.

17. The circuit as claimed in claim 16 wherein said first inductor comprises a transformer having a primary winding coupled to the half-bridge point and a secondary winding coupled to the output terminal, said transformer, said impedance means and said charging capacitor being chosen so that the transformer supplies an operating voltage to the output terminal that is essentially independent of the DC supply voltage of the power supply.

18. The circuit as claimed in claim 13 wherein the impedance means comprises a transformer having a primary winding coupled to the half-bridge point and a secondary winding coupled to the output terminal, and said charging capacitor is coupled to the half-bridge point via said transformer primary winding.

19. The circuit as claimed in claim 13 wherein the half-bridge circuit comprises first and second switching transistors connected in series circuit across the output of the rectifier means, and the rectifier element is connected in series with the charging capacitor.

20. The circuit as claimed in claim 13 wherein the power supply further comprises a series circuit of a second rectifier element and further capacitor coupled across the one rectifier element and arranged to couple the DC supply voltage to the control circuit means.

21. The circuit as claimed in claim 13 wherein the impedance means comprises an inductor connected in series with the charging capacitor to said half bridge point and to said output terminal via a transformer.

22. The circuit as claimed in claim 21 wherein the rectifier element is a zener diode connected in series with the inductor and the charging capacitor.

23. The circuit as claimed in claim 21 wherein the rectifier element is connected in series with the inductor and the charging capacitor and the output terminal is coupled to the half-bridge point via the transformer and the inductor.

24. The circuit as claimed in claim 21 wherein the output terminal is coupled to the half-bridge point via the transformer and the inductor but not via the charging capacitor.

25. The circuit as claimed in claim 13 wherein the output terminal is coupled to the half-bridge point via a first circuit path that includes the impedance means, and the charging capacitor is coupled to the half-bridge point via a second circuit path that includes the impedance means.

26. The circuit as claimed in claim 25 wherein the impedance means comprises an inductor.

27. The circuit as claimed in claim 13 wherein the impedance value of the impedance means is chosen so that a current flow through the power supply rectifier element is practically constant and independent of the voltage level at an output of the rectifier means.

* * * * *